US007881012B2

(12) United States Patent
Mochizuki et al.

(10) Patent No.: US 7,881,012 B2
(45) Date of Patent: Feb. 1, 2011

(54) MAGNETIC HEAD AND MAGNETIC DISK STORAGE APPARATUS MOUNTING THE HEAD

(75) Inventors: Masafumi Mochizuki, Tokyo (JP); Kimitoshi Etoh, Kanagawa (JP); Youji Maruyama, Saitama (JP); Hiroshi Fukui, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 990 days.

(21) Appl. No.: 11/707,415

(22) Filed: Feb. 15, 2007

(65) Prior Publication Data

US 2007/0211382 A1   Sep. 13, 2007

(30) Foreign Application Priority Data

Feb. 16, 2006  (JP)  ............................. 2006-039777

(51) Int. Cl.
*G11B 5/17* (2006.01)
(52) U.S. Cl. .................................. 360/125.09
(58) Field of Classification Search ............ 360/125.09, 360/122, 125.38, 125.12, 125.06, 125.08, 360/125.07
See application file for complete search history.

(56) References Cited

U.S. PATENT DOCUMENTS

| | | | |
|---|---|---|---|
| 6,108,167 A | 8/2000 | Tateyama et al. | |
| 6,198,597 B1 | 3/2001 | Tateyama et al. | |
| 6,304,415 B1 | 10/2001 | Tateyama et al. | |
| 6,809,899 B1 * | 10/2004 | Chen et al. | 360/125.13 |
| 6,813,116 B2 | 11/2004 | Nakamura et al. | |
| 6,857,181 B2 | 2/2005 | Lo et al. | |
| 6,891,697 B2 | 5/2005 | Nakamura et al. | |
| 6,952,325 B2 * | 10/2005 | Sato et al. | 360/125.08 |
| 7,535,675 B2 * | 5/2009 | Kimura et al. | 360/125.09 |
| 7,710,685 B2 * | 5/2010 | Kimura et al. | 360/125.09 |
| 2002/0176214 A1 * | 11/2002 | Shukh et al. | 360/317 |
| 2003/0076627 A1 * | 4/2003 | Minor et al. | 360/125 |
| 2003/0076629 A1 * | 4/2003 | Minor | 360/126 |
| 2003/0151850 A1 | 8/2003 | Nakamura et al. | |
| 2004/0027729 A1 | 2/2004 | Lo et al. | |
| 2005/0057853 A1 | 3/2005 | Nakamura et al. | |
| 2005/0105215 A1 | 5/2005 | Matono | |
| 2006/0002018 A1 * | 1/2006 | Fukui et al. | 360/125 |
| 2006/0221497 A1 * | 10/2006 | Okada et al. | 360/125 |
| 2007/0195454 A1 * | 8/2007 | Kimura et al. | 360/126 |
| 2008/0316645 A1 * | 12/2008 | Sin | 360/123.02 |

FOREIGN PATENT DOCUMENTS

| | | |
|---|---|---|
| JP | 2003-242608 | 8/2003 |
| JP | 2005-93029 | 4/2005 |

* cited by examiner

*Primary Examiner*—Allen T Cao
(74) *Attorney, Agent, or Firm*—Patterson & Sheridan, LLP

(57) ABSTRACT

Embodiments in accordance with the present invention provide a magnetic head in which broadening of the write-field distribution in the track-width direction can be decreased without reducing the write-field intensity. A main pole includes a pole tip having a part which provides the write track-width and a yoke part recessed from the air bearing surface in the element height direction, the pole tip including at least two magnetic films having different track-width directions, and the throat height at the trailing side being made smaller than the throat height at the leading side.

8 Claims, 17 Drawing Sheets

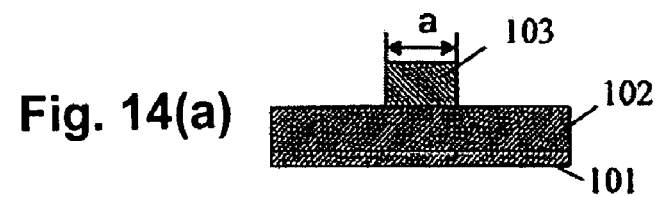
Fig. 14(a)
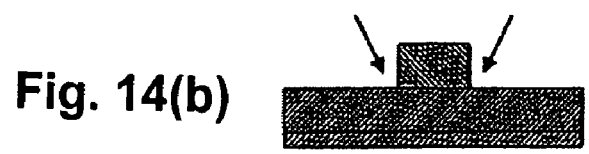
Fig. 14(b)
Fig. 14(c)
Fig. 14(d)
Fig. 14(e)
Fig. 14(f)
Fig. 14(g)
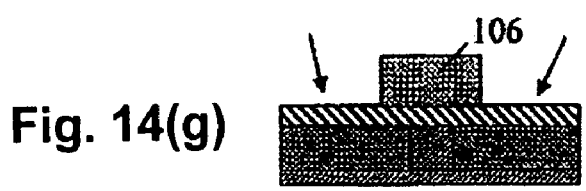
Fig. 14(h)

MAGNETIC HEAD AND MAGNETIC DISK STORAGE APPARATUS MOUNTING THE HEAD

CROSS-REFERENCE TO RELATED APPLICATION

The instant nonprovisional patent application claims priority to Japanese Patent Application 2006-039777, filed Feb. 16, 2006 and incorporated by reference in its entirety herein for all purposes.

BACKGROUND OF THE INVENTION

Embodiments in accordance with the present invention relate to a magnetic head for perpendicular recording, a magnetic disk storage apparatus mounting the head, and a manufacturing method of a magnetic head.

A magnetic disk storage apparatus includes a recording medium and a magnetic head, and data on the recording medium are read/written by the magnetic head. It is desirable to reduce a recorded bit for improving the recording capacity per unit area of the magnetic recording medium. However, in a current longitudinal recording method, there is the problem that the recording density cannot be increased because the issue of the thermal fluctuation of the magnetization of the medium arises when the recording bit length becomes smaller. A solution to this problem is a perpendicular recording method, in which the magnetization signal is recorded in the direction perpendicular to the medium. There are two kinds of perpendicular recording methods; one is a method using a double-layer perpendicular medium which includes a soft under layer as the recording medium and another is a method using a single-layer perpendicular medium which does not include a soft under layer. In the case when the double-layer perpendicular medium is used as the recording medium, a larger write-field can be applied thereto when writing is performed by using a so-called single-pole-type writer which includes a main pole and an auxiliary pole. Considering the case where the head has a skew angle, it is assumed that the shape of the air bearing surface of the main pole is a trapezoidal shape where the width at the leading side is narrower.

Moreover, the field gradient in the perpendicular element profile of the head field which writes the transition of the write bit cell, that is, the field gradient of the head field in the head downtrack direction is an important factor to achieve a high recording density in addition to the write head field intensity. The field gradient has to be increased further to achieve a higher recording density in the future. A structure where a magnetic material is arranged at the trailing side of the main pole is known to improve the write-field gradient. Moreover, a structure where a magnetic material is arranged at the side of the main pole is also known.

Generally, a magnetic head is manufactured by stacking magnetic films, in order, on a substrate by using a sputtering technique or a plating technique. Therefore, a conventional structure is one where the face at the leading side of the main pole is parallel to the substrate and perpendicular to the head air bearing surface.

BRIEF SUMMARY OF THE INVENTION

Embodiments in accordance with the present invention provide a magnetic head in which broadening of the write-field distribution in the track-width direction can be decreased without reducing the write-field intensity. As shown in the embodiment of FIG. 4, a main pole consists of a pole tip 1B having a part which provides the write track-width and a yoke part 1A recessed from the air bearing surface in the element height direction, the pole tip 1B consisting of at least two magnetic films 1B_T and 1B_L having different track-width directions, and the throat height Th_T at the trailing side being made smaller than the throat height Th_L at the leading side.

BRIEF DESCRIPTION OF THE DRAWINGS

FIG. 14 is a drawing illustrating an example of a manufacturing method of a magnetic head in accordance with an embodiment of the present invention.

DETAILED DESCRIPTION OF THE INVENTION

Figure 1A:
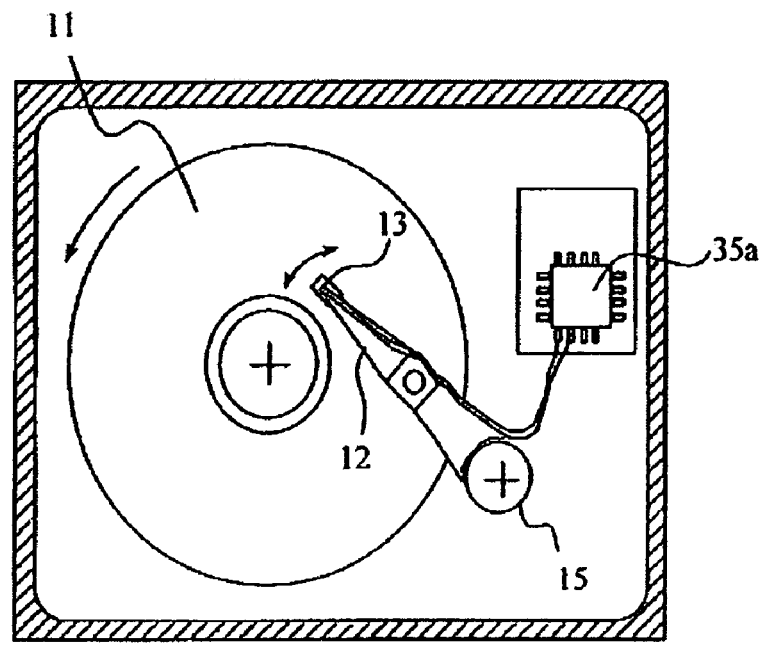
FIG. 1 is a conceptual drawing illustrating a magnetic storage disk apparatus.

Embodiments in accordance with the present invention relate to a perpendicular recording system which uses a perpendicular recording head having a main pole and an auxiliary pole and a double-layer perpendicular recording medium having a soft magnetic layer. Even in a perpendicular recording, a magnetic film having a large coercivity is used for the recording layer in order to achieve a high recording density.

Therefore, an increase in the write-field intensity applied to the recording layer and an increase in the write-field gradient at the trailing side are necessary. In addition, it is important to make narrower the write-field distribution in the track-width direction. The magnetization width which is written on the recording medium has to be made smaller by suppressing the write-field distribution in the track-width direction. Moreover, the decay and erasure of magnetization information which has already been recorded on the adjacent track can be avoided by reducing the write-field intensity applied to a track which is adjacent to the track being written.

One of the techniques to increase the write-field intensity is to shorten the distance between the soft under layer and the write head. However, a certain degree of film thickness of the recording layer is necessary in order to improve the decay of magnetization caused by thermal fluctuation. Moreover, there are factors which prevent a reduction in the distance between the soft under layer and the head, such as smoothness of the recording layer surface, a lubricant, and the existence of a protection film for the head. Another approach is an increase in the film thickness of the head main pole. Even in the same track-width, the write-field intensity can be made greater by increasing the film thickness of the head main pole and increasing the area of the air bearing surface of the main pole. However, in the case when the film thickness of the head main pole is increased, a large write-field is applied to the adjacent track when a write head has a skew angle.

In a magnetic disk apparatus, a suspension arm on which a head slider is fixed scans from the inside to the outside of the magnetic medium in order to perform read/write. Therefore, the head has a different angle against the write-track according to the position of the recording medium. This is the skew angle. The write-field of the double-layer perpendicular medium system has a distribution corresponding to the shape of the opposite surface of the head main pole. In the case when the film thickness of the head main pole is increased, the opposite surface of the air bearing surface of the head main pole approaches the adjacent track and a large write-field is applied to the adjacent track. As a result, decay and erasure of data on the adjacent track occur. Considering the case where the write head has a skew angle, there is a technology that the shape of the air bearing surface of the main pole is made to have a trapezoidal shape where the width of the leading side is narrower. However, when the shape of the air bearing surface of the main pole is made to have a trapezoid shape, the write-field intensity is also decreased because of the reduction in the area. In addition, a problem arises that the track width varies in the manufacturing process to make it a trapezoidal shape.

When magnetic materials are arranged at the trailing side and at the side of the main pole, although the write-field gradient at the trailing side increases and the distribution thereof in the track-width direction can be suppressed, there is a disadvantage that the field intensity decreases.

As mentioned above, applying a large write-field intensity is necessary to increase the recording density without a decay and erasure of data on the adjacent track by making the write-track width on the medium smaller. This is a problem to be solved in order to achieve even higher recording density of a magnetic disk apparatus using a perpendicular recording.

It is an objective of embodiments in accordance with the present invention to provide a magnetic head for perpendicular recording and a manufacturing method thereof on which a large write-field intensity is obtained, a narrow track can be achieved, and a large write-field intensity can be generated without decay and erasure of data on the adjacent track. Moreover, it is an objective of embodiments of the present invention to provide a magnetic disk apparatus mounting the magnetic head for perpendicular recording.

A magnetic head in accordance with an embodiment of the present invention includes a main pole and an auxiliary pole, in which the main pole has a pole tip providing the write-track width and a yoke part recessed from the pole tip in the element-height direction; the pole tip includes at least two magnetic films having different widths in the track-width direction; the width in the track-width direction at an air bearing surface of the magnetic film at the trailing side is greater than the width in the track-width direction at an air bearing surface of the magnetic film at the leading side; and a throat height of the magnetic film at the trailing side is smaller than a throat height of the magnetic film at the leading side. At this time, it is preferable that the width of the magnetic film in the track-width direction at the trailing side of the pole tip be greater than the film thickness in the downtrack direction. Furthermore, at the air bearing surface, it is desirable that the difference of the widths of the part where the magnetic film at the trailing side and the magnetic film of the leading side of the pole tip are connected to each other be greater than the film thickness in the downtrack direction of the magnetic film in the trailing direction.

The flare angle of the squeeze point of the pole tip may be different between the magnetic film at the trailing side and the magnetic film at the leading side. Moreover, the shapes of the air bearing surface of the magnetic film at either the trailing side or the leading side, or both sides of the pole tip may be made a reverse-trapezoid shape. Furthermore, the magnetic film of the pole tip at the leading side may be recessed from the air bearing surface.

According to a main pole structure in accordance with an embodiment of the present invention, a large write field can be generated even if the width of the write-field distribution in the head downtrack direction is small, and, even in the case when the head has a skew angle, data of the adjacent track is decayed and/or erased and the recording density can be increased. Herein, the head air bearing surface means the face opposite the magnetic film medium constituting the head excluding the overcoat composed of a non-magnetic material such as carbon.

According to embodiments of the present invention, broadening the write-field distribution in the track-width direction can be decreased without reducing the maximum write-field, and the write effective width can be made smaller. Moreover, it is possible to provide a magnetic head, in which the write-field applied to the adjacent track can be decreased and the distance between tracks be made more narrow, and to provide a magnetic disk apparatus mounting it.

Hereafter, an embodiment of the present invention is described referring to the drawings. In the following drawings, the same reference codes are given to parts with a similar function.

Figure 1B:
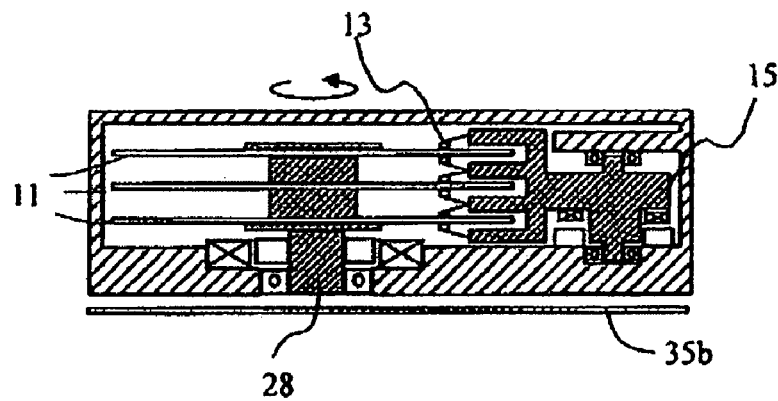

FIG. 1 shows conceptual drawings illustrating a magnetic disk storage apparatus. The magnetic disk storage apparatus performs read/write of a magnetic signal by using a magnetic head mounted on a slider 13 which is fixed at the tip of a suspension arm 12 at a predetermined position over a magnetic disk (recording medium) 11 which is rotated by a motor 28. The position of the magnetic head in the direction of the radius of the magnetic disk (track) can be selected by driving a rotary actuator 15. A write signal to the magnetic head and a read signal from the magnetic head can be processed by the signal processing circuits 35a and 35b.

Figure 2:
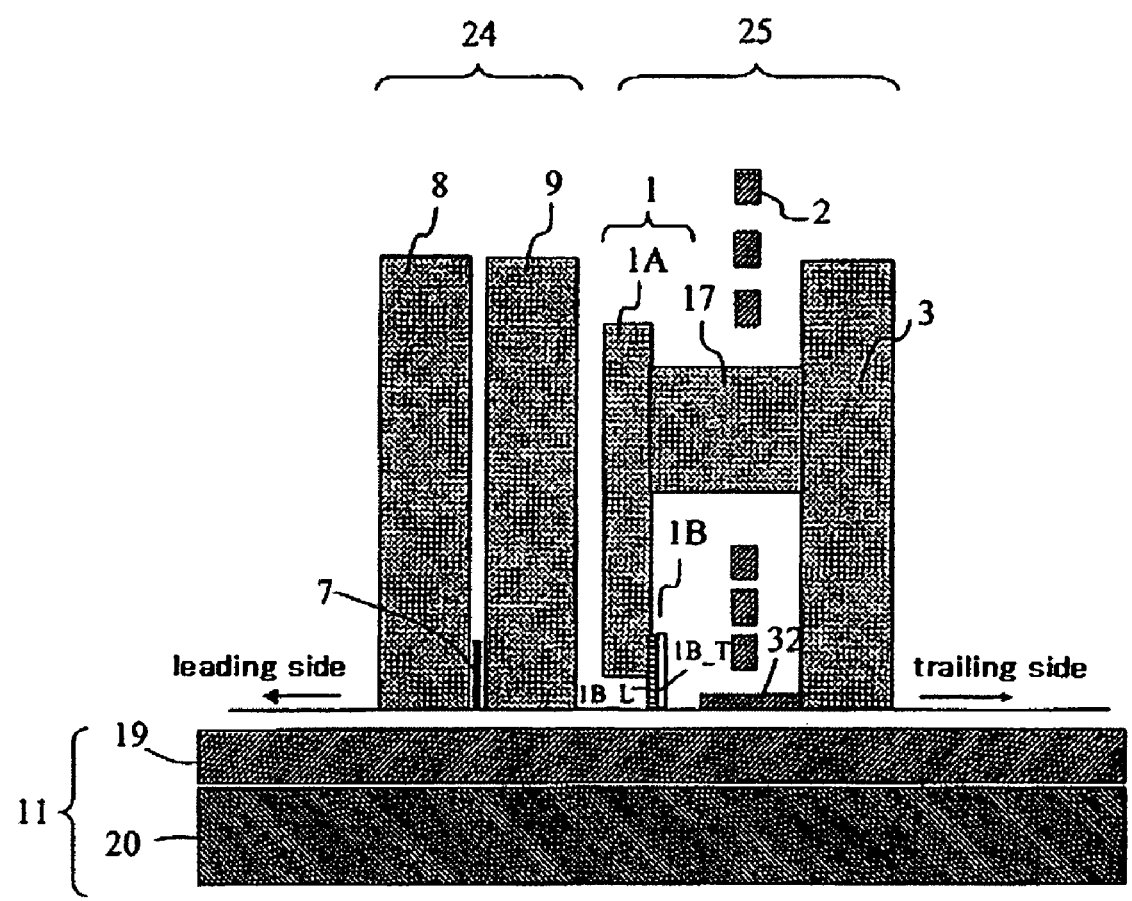
FIG. 2 is a cross-sectional schematic drawing illustrating an example of a magnetic head of the present invention at the track center.
Figure 3:
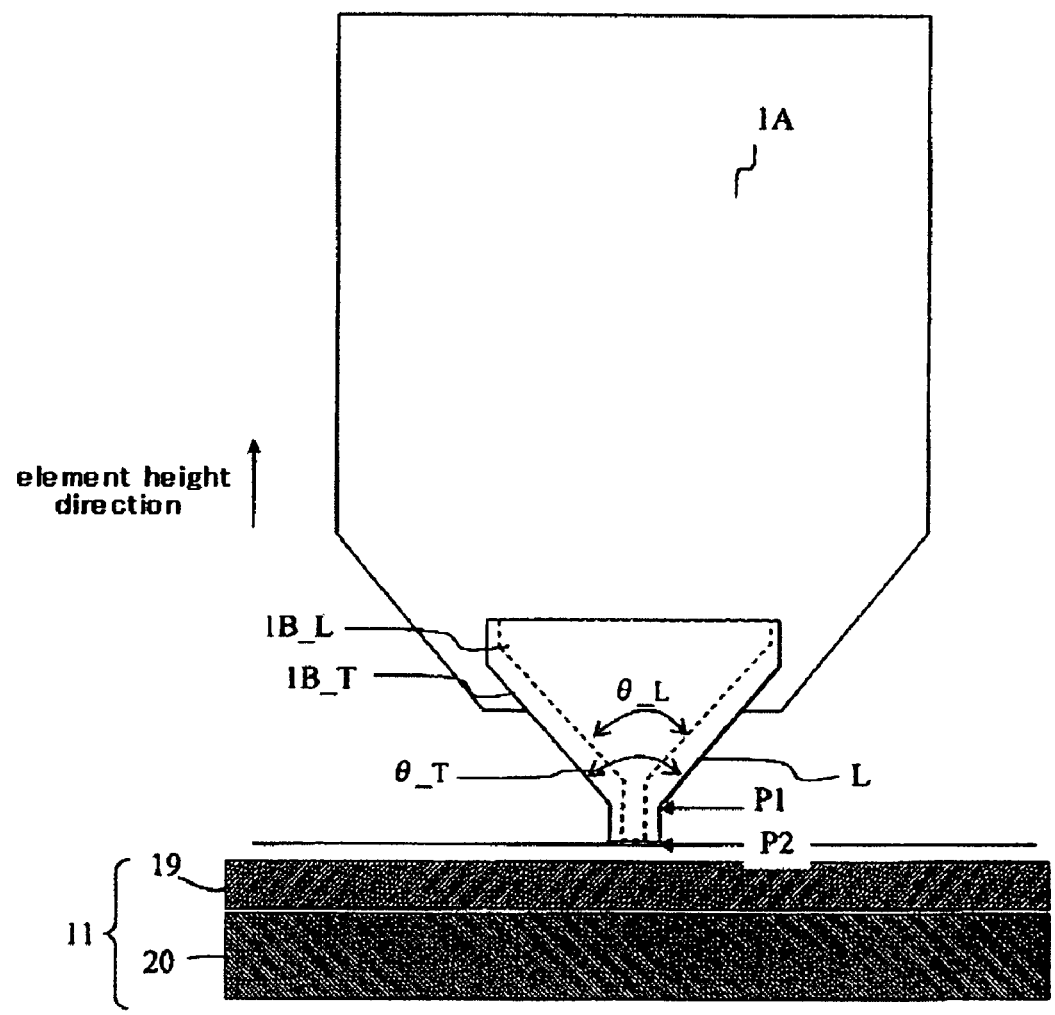
FIG. 3 is a plane schematic drawing illustrating an example of a magnetic head in accordance with an embodiment of the present invention as seen from the trailing direction.
Figure 4:
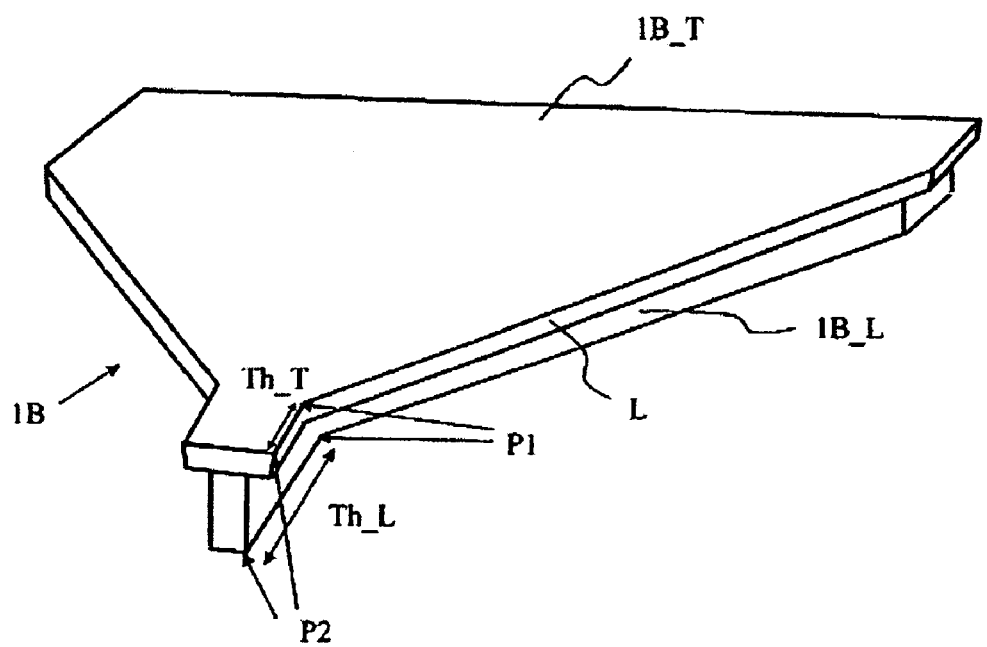
FIG. 4 is a schematic perspective drawing illustrating an example of a pole tip of a magnetic head in accordance with an embodiment of the present invention.

FIG. 2 is a cross-sectional drawing illustrating an example of a magnetic head of an embodiment of the present invention at the track center. FIG. 3 is a plane schematic drawing illustrating a main pole as seen from the trailing direction. FIG. 4 is a schematic perspective drawing of the pole tip 1B illustrating an example of a main pole built into a magnetic head of an embodiment of the present invention. Schematic cross-sectional drawings illustrating the recording medium 11 are also shown in FIGS. 2 and 3.

This magnetic head includes a read/write composite head having a write head (single-pole-head) 25 which includes a main pole 1 and an auxiliary pole 3 and a read head 24 having a read element 7. The read element 7 includes a giant magnetoresistive element (GMR) and a tunneling magnetoresistive element (TMR), etc. is arranged at the gap of a pair of magnetic shields (read shield) consisting of a lower shield 8 at the leading side and a upper shield 9 at the trailing side. The main pole 1 and the auxiliary pole 3 are magnetically connected by a pillar 17 at a position left of the air bearing surface and a thin film coil 2 is interlinked with a magnetic circuit consisting of a main pole, an auxiliary pole 3, and a pillar 17. The main pole 1 is arranged at the leading side of the auxiliary pole 3. The main pole 1 consists of a main pole yoke part 1A which is connected to the auxiliary pole 3 by the pillar 17 and a pole tip 1B which is exposed to the head air bearing surface and provides the track-width.

The pole tip 1B includes at least two parts which have different widths in the track-width direction at the air bearing surface, and the throat height Th_T of the pole tip 1B_T at the trailing side is made to be smaller than the throat height Th_L of the pole tip 1B_L at the leading side (refer to FIG. 4). Herein, in the pole tip 1B, the throat height is the length from the opposite face to the position (squeeze point) where the rate of change of the magnetic pole width in the track-width direction changes along the element height direction from the opposing medium surface in order to concentrate the magnetic flux to the tip part which provides the track width opposite the medium 11. Moreover, at the air bearing surface, the width in the track direction of the pole tip 1B_T at the trailing side is greater than that of the pole tip 1B_L at the leading side.

Figure 5:
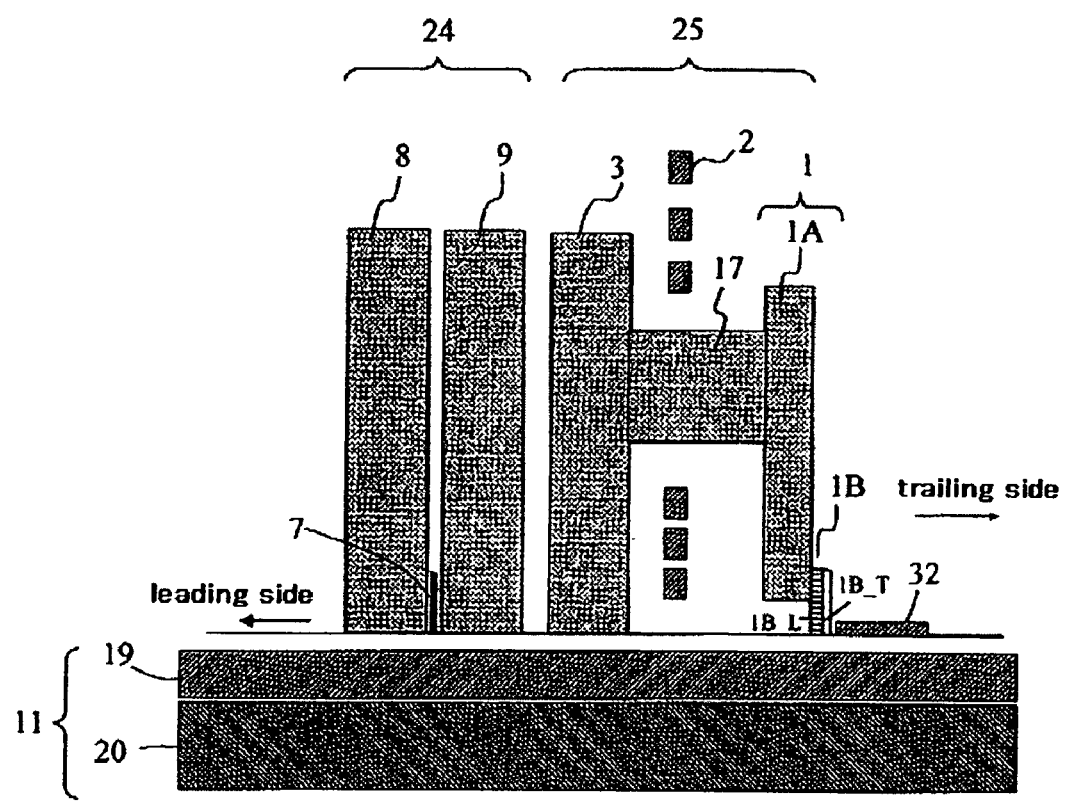
FIG. 5 is a cross-sectional schematic drawing at the track center illustrating another example of a magnetic head in accordance with an embodiment of the present invention.

The magnetic material 32 arranged at the trailing side of the main pole 1 is for increasing the write-field gradient of the perpendicular element profile of the head field in the head downtrack direction. In the head structure shown in FIG. 2, although the auxiliary pole 3 is arranged at the leading side of the main pole 1, the auxiliary pole 3 may be arranged at the leading side of the main pole 1 as shown in FIG. 5. The write-field generated from the main pole 1 of the write head 25 forms a magnetic circuit which goes into the auxiliary pole 3 through the recording layer 19 and the soft under layer 20 of the recording medium 11 and a magnetization pattern is written on the recording layer 19. An intermediate layer may be formed between the recording layer 19 and the soft under layer 20.

Figure 6:
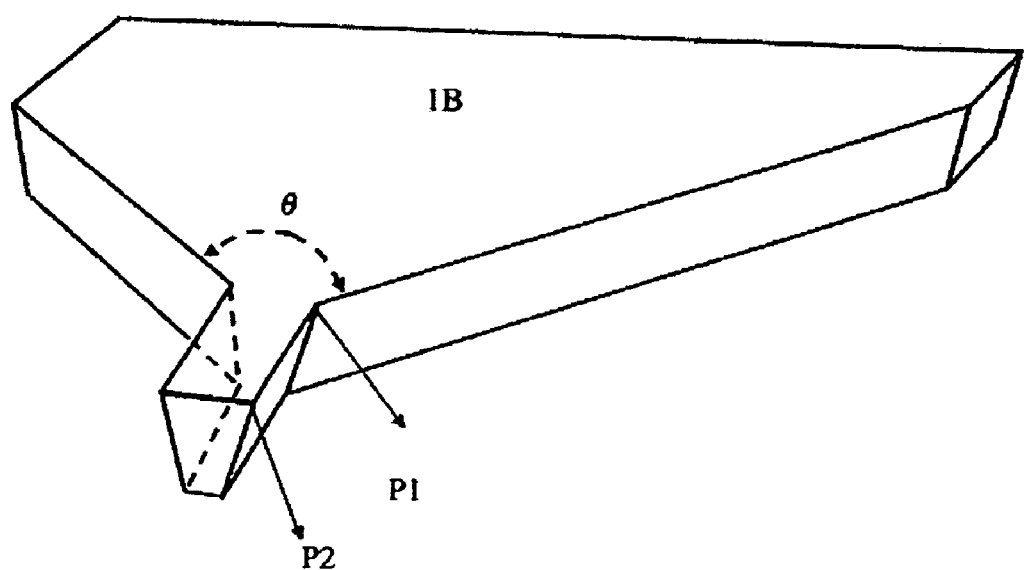
FIG. 6 is a schematic perspective drawing illustrating a pole tip of a conventional magnetic head structure.

The write field generated from the main pole to the magnetic head of the present invention and a magnetic head of the prior art was calculated by using a three-dimensional field calculation. As shown in FIG. 4, the main pole of the magnetic head of the present invention has a pole tip 1B that includes at least two magnetic film layers having different widths in the track-width direction at the air bearing surface, and the throat height of the pole tip 1B_T at the trailing side becomes smaller than the throat height of the pole tip 1B_L at the leading side. The pole tip 1B which is included in a main pole of the prior art used for the calculation has a reverse-trapezoid structure where the width in the track direction continuously decreases from the trailing side to the leading side, as shown in FIG. 6.

The calculation conditions are as follows. The tip part of the magnetic film including the pole tip 1B_T at the trailing side of the magnetic head of the present invention shown in FIG. 4 is set to be a rectangle with a width of 100 nm and a thickness of 30 nm. Moreover, the tip part of the magnetic film including the pole tip 1B_L at the trailing side is set to be a rectangle with a width of 40 nm and a thickness of 170 nm. Furthermore, the throat height Th_T of the pole tip 1B_T at the trailing side is set to be 50 nm and the throat height Th_L of the pole tip 1B_L at the leading side is set to be 100 nm. In FIG. 4, P1 is called a squeeze point which is the point of intersection of the line L of the slope of the pole tip 1B and the perpendicular along the element height direction from the edge of the air bearing surface of the pole tip 1B, and the throat height is the distance from the squeeze point P1 to the edge of the air bearing surface P2. Moreover, in the schematic structural drawing of the main pole as seen from the trailing side shown in FIG. 3, the flare angles of θ_L and θ_T are both assumed to be 90 degrees.

CoNiFe is assumed as a material of the pole tips 1B_T and 1B_L and the saturation magnetic flux density and the relative permeability are set to be 2.4 T and 500, respectively. 80 at % Ni-20 at % Fe having a saturation magnetic flux density of 1.0 T is assumed as the yoke part 1A of the main pole. A material having a saturation magnetic flux density of 1.0 T is assumed as the auxiliary pole 3, and the size is set such that the width in the track width direction is 30 μm, the length in the element height direction 16 μm, and the film thickness 2 μm. 80 at % Ni-20 at % Fe having a saturation magnetic flux density of 1.0 T is assumed as the upper shield 9 and the lower shield 8, and the size is set such that the width in the track width direction is 32 μm, the length in the element height direction 16 μm, and the film thickness 1.5 μm. The magnetic material 32 is not considered in this calculation.

CoTaZr is assumed as a material of the soft under layer 20 of the recording medium 11, and the distance from the surface of the soft under layer 20 from the head air bearing surface and the film thickness of the soft under layer are set to be 40 nm and 150 nm, respectively. The write field was calculated at the position where the center position of the recording layer is assumed to be 25 nm away from the head air bearing surface. Only a film thickness of 20 nm was considered for the medium recording layer 19.

For a magnetic head of the prior art having a main pole which is symmetrical to the track center shown in FIG. 6, calculations were carried out under the same conditions as the magnetic head of the aforementioned embodiment, including both shape and material, except for the shape of the pole tip 1B of the main pole. The tip part of the pole tip 1B is set to be 100 nm in width and 200 nm in film thickness. The shape of the air bearing surface is made to be a reverse-trapezoid shape where the width of the leading side is smaller. The width of the pole tip part at the leading side is set to be 40 nm. The throat height is set to be 80 nm.

Figure 7:
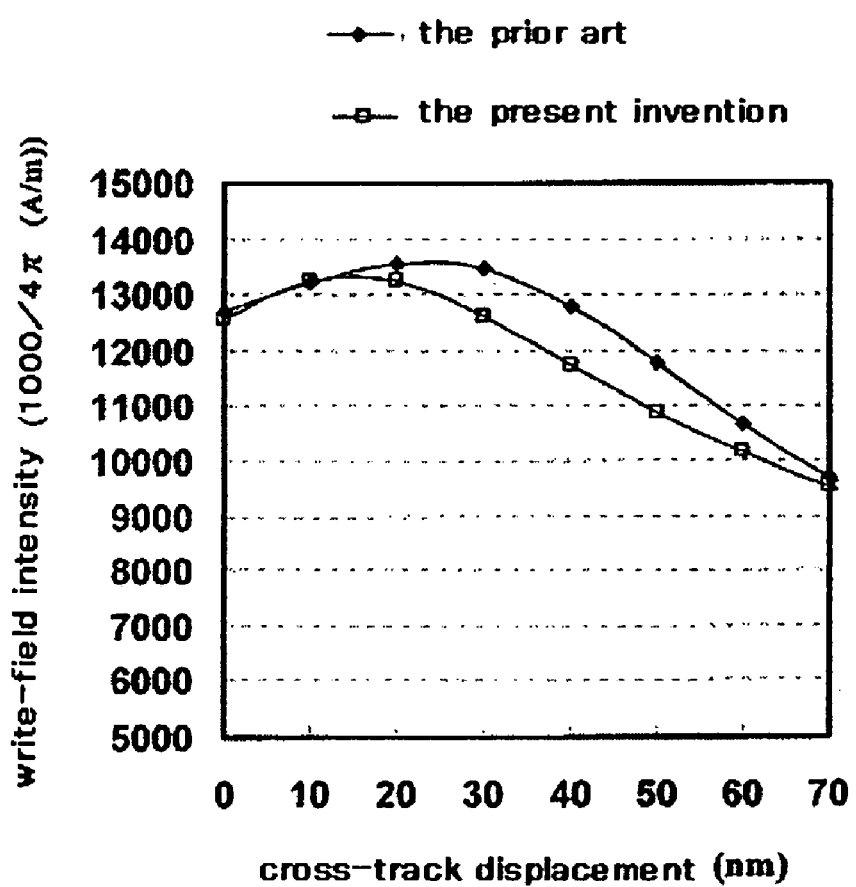
FIG. 7 is a comparison of the write-field distribution in the track-width direction between a magnetic head in accordance with an embodiment of the present invention and a conventional magnetic head.

FIG. 7 shows the results of a calculation. FIG. 7 is a graph illustrating a comparison of the write-field distribution in the track-width direction of a magnetic head of the present invention and a magnetic head of the prior art. The write-field is extracted in the track-width direction at the center position of the main pole. The horizontal axis is the position in the track width direction and the vertical axis is the write field intensity. The origin of the horizontal axis is the track center position of the main pole. In the case of the aforementioned conditions, according to the magnetic head of the present invention, broadening the magnetic field in the track-width direction can be made smaller without reduction of the write field intensity and the write effective width can be made smaller, resulting in a high recording density being achieved. Compared with a magnetic head having a conventional structure, assuming a position where writing is determined, a magnetic head of the present invention attempts to reduce the write-field width to about 5 to 10 nm at one side of the track shown in the figure in the vicinity from 10000-12000(×1000/4π (A/m)). Therefore, there is an attempt to decrease the write-field width to 10 to 20 nm on both sides of the track.

Figure 8:
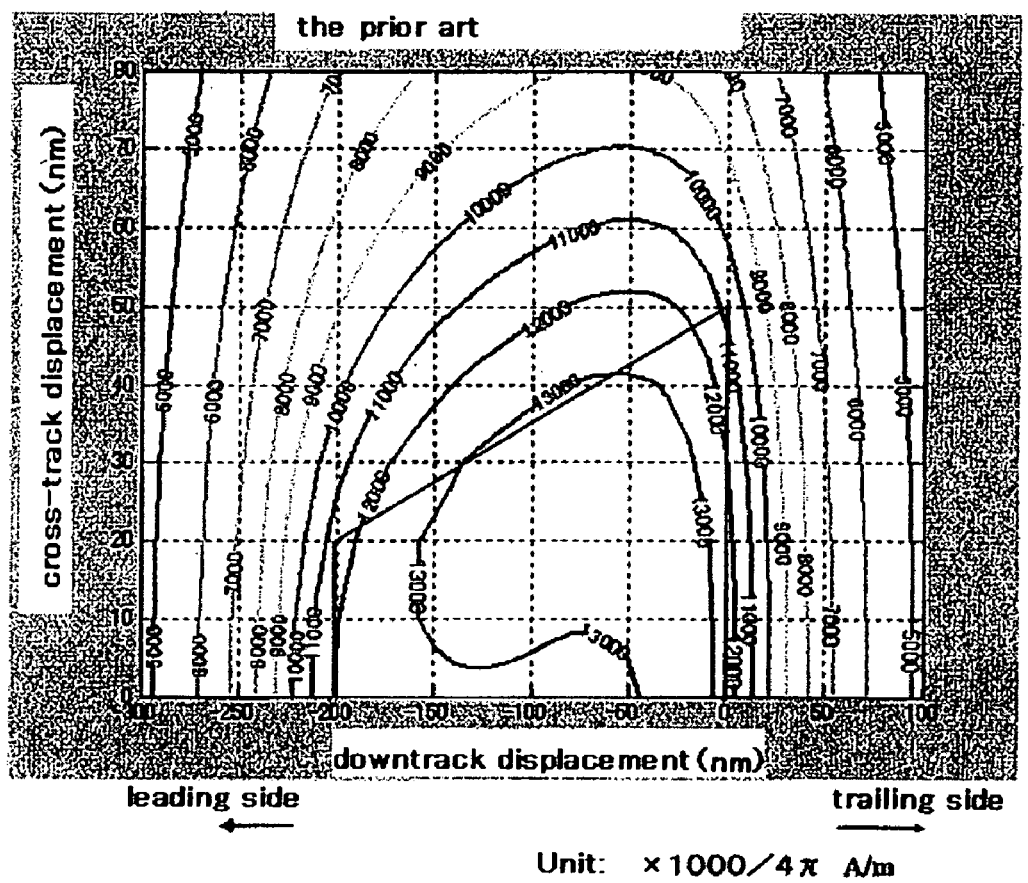
FIG. 8 is a drawing illustrating contour lines of the write-field of a conventional magnetic head.

FIG. 8 is a write-field distribution at the center position of a recording layer of a conventional magnetic head. The contour line of the write-field distribution is along the shape of the air bearing surface of the main pole. The vertical axis is the cross-track displacement and the horizontal axis is the downtrack displacement. The origin of the vertical axis is the track center position. The right side of the horizontal axis is the trailing side. The solid line in the figure denotes the position opposites to the main pole. The position where the broadening of the write-field distribution in the track-width direction is large is located toward the leading side several tens of nanometers from the trailing edge position of the main pole magnetic material.

Figure 9:
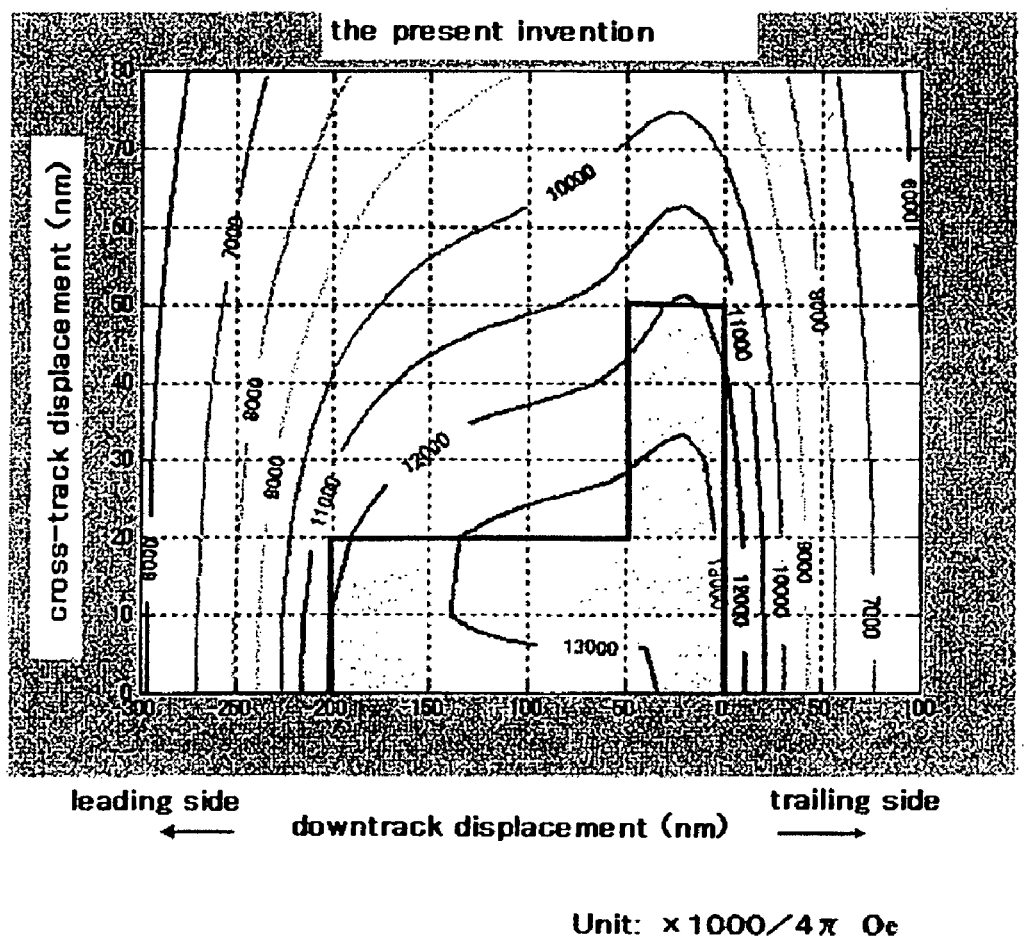
FIG. 9 is a drawing illustrating contour lines of the write-field of a magnetic head in accordance with an embodiment of the present invention.

FIG. 9 is a write-field distribution in the case of an embodiment of a head structure in accordance with the present invention. In the case of a head structure according to an embodiment of the present invention, the tip of the pole tip consists of two magnetic film layers having different widths, the width of the pole tip in the track-width direction at the leading side being small, and the throat height of the pole tip at the leading side being large, resulting in a broadening in the track-width direction being further decreased. In the present invention, broadening the write effective width is decreased by making the throat height at the trailing side large, and the write-field intensity is compensated by making the throat height at the leading side small. The throat height at the trailing side is preferably set to be 500 nm or less where a large write-field can be obtained. Moreover, the difference between the throat height at the trailing side and the throat height at the leading side is preferably 50 nm or more considering the variations in manufacturing.

JP 2003-242608 A discloses a magnetic head having a T-shaped air bearing surface, but there is no description of a throat height. In the case of the same throat height, the write-field intensity decreases and the effect obtained in the present invention cannot be obtained. Moreover, JP 2005-93029 A discloses a head having a different throat height, but the dimensions of the magnetic material in the track-width direction at the trailing side and the leading side are the same, so that the effect obtained in the present invention cannot be obtained because of broadening the write-field distribution in the track-width direction.

Figure 10:
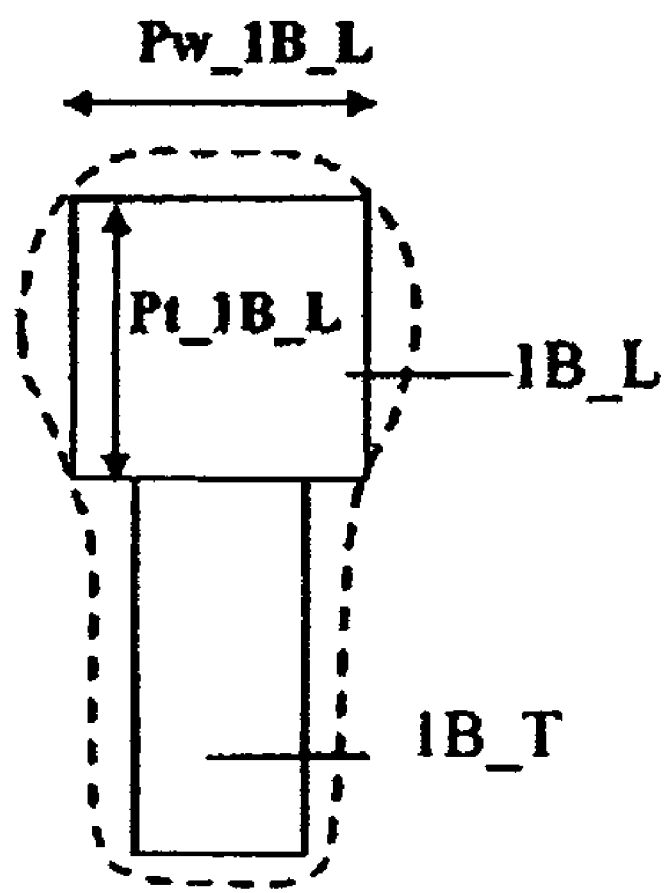
FIG. 10 is a schematic drawing illustrating a pole tip as seen from the air bearing surface.

In a magnetic head according to an embodiment of the present invention, it is preferable that the width of the magnetic film 1B_T in the track-width direction at the trailing side of the pole tip be larger than the film thickness in the downtrack direction when it is seen from the air bearing surface. As shown in FIG. 10, in the case when the width thereof in the track-width direction Pw_1B_T is smaller than the film thickness in the downtrack direction Pt_1B_T, the write-field distribution becomes very large in the track-width direction at the position of the magnetic material at the trailing side, resulting in the effect being very small because of a shape in portrait orientation against the downtrack direction.

Moreover, in accordance with an embodiment of the present invention, the difference of the magnetic film in the track-width direction between the magnetic film 1B_T at the trailing side of the pole tip is important and the magnetic film 1B_L at the leading side thereof. It is preferable that the difference of the widths of the magnetic films in the track-width direction between the magnetic film 1B_T at the trailing side and the magnetic film 1B_L at the leading side be greater than the film thickness of the magnetic film 1B_T at the trailing side. If the difference is small, the distribution in the width direction does not become small. According to such a structure, the write-field distribution width at the leading side can be further decreased.

Figure 11:
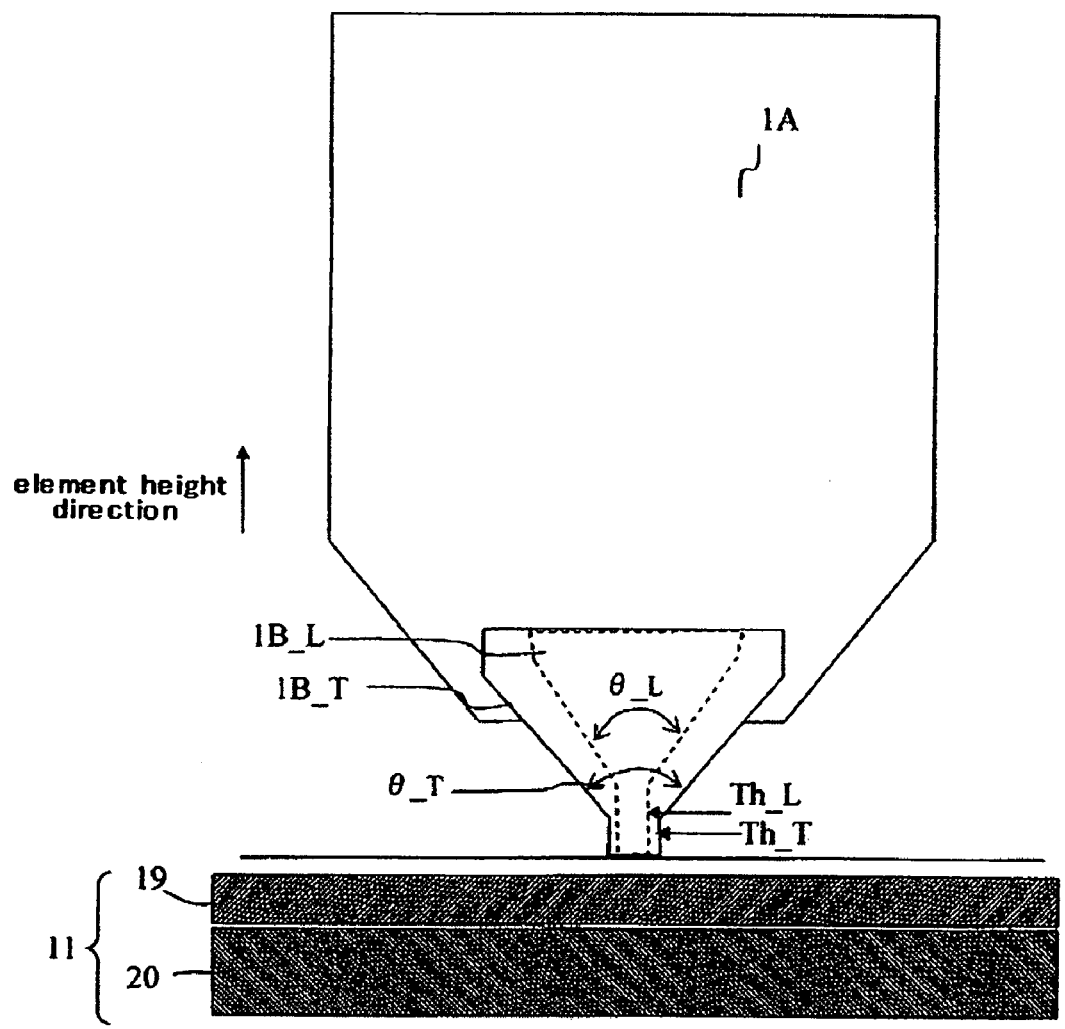
FIG. 11 is a plane schematic drawing illustrating another example of a magnetic head in accordance with an embodiment of the present invention as seen from the trailing direction.

FIG. 11 is a plane schematic drawing illustrating another structural example of a main pole of an embodiment of a magnetic head of the present invention as seen from the trailing side. The pole tip 1B of the main pole of the magnetic head includes at least two magnetic films having different widths in the track-width direction at the air bearing surface and has a structure in which the width in the track-width direction of the pole tip 1B_T at the trailing side is greater than that of the pole tip 1B_L at the leading side at the air bearing surface; the throat height Th_L of the pole tip 1B_L at the leading side is greater than the throat height Th_T of the pole tip 1B_T at the trailing side; and the flare angle θ_T of the magnetic film constituting the pole tip 1B_T at the trailing side is greater than the flare angle θ_L of the squeeze point of the magnetic film including the pole tip 1B_L at the leading side. Even if such a main pole structure is taken, a smaller flare angle results in a smaller write-field intensity and a narrower write-field distribution width in the track-width direction, resulting in the effect shown in FIG. 7 being obtained. The write-field intensity takes the maximum value when the flare angle θ_T of the magnetic film 1B_T at the trailing side is between 100 and 110 degrees. Then, it is preferable that the flare angle θ_L of the squeeze point of the magnetic film at the leading side be made greater than that.

Moreover, in accordance with an embodiment of the present invention, it is preferable that the saturation magnetic flux density of the magnetic film at the trailing side be greater than that at the leading side. As a result, magnetic flux is concentrated to the trailing side, and the effect of suppressing distribution in the width direction is achieved even more.

Figure 12A:
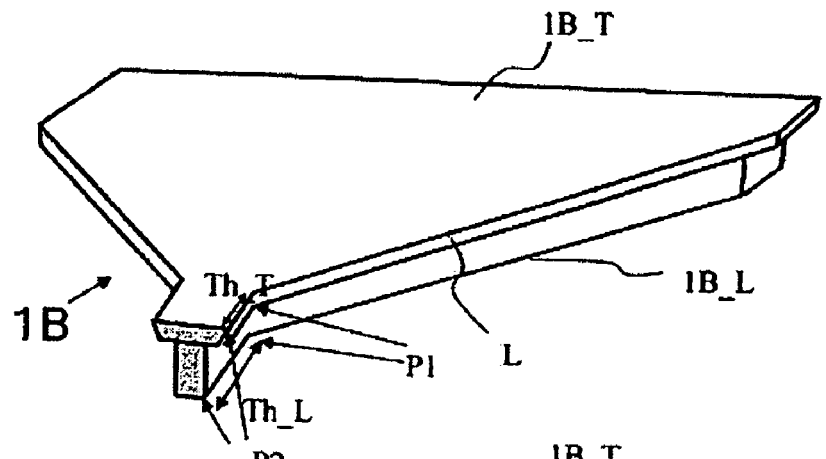
FIG. 12 is a schematic perspective drawing illustrating an example of a pole tip of a magnetic head in accordance with an embodiment of the present invention.
Figure 12B:
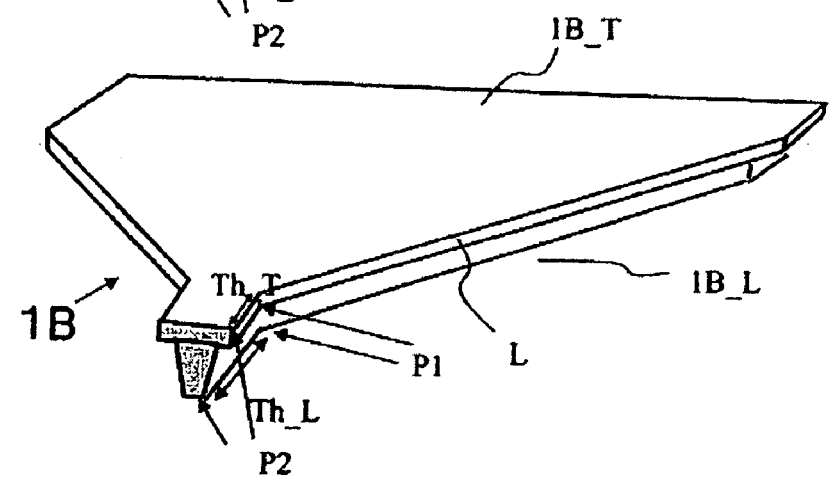
Figure 12C:
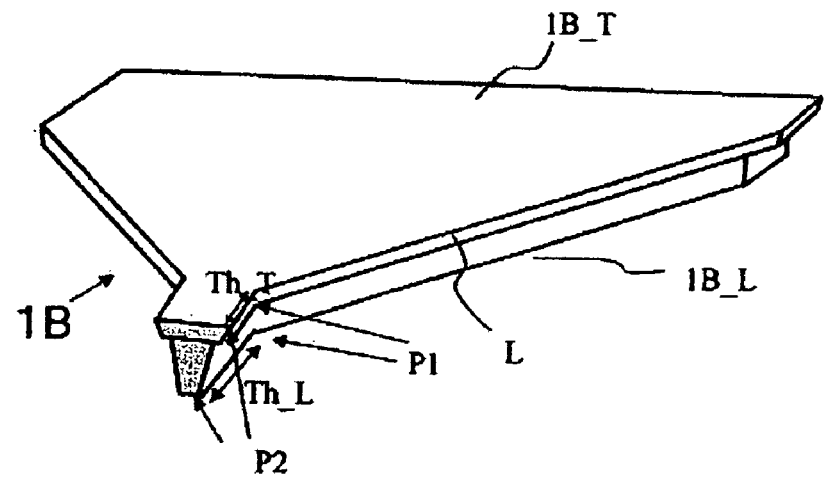

Moreover, as shown in FIG. 12, the shape of the air bearing surface of the magnetic film at the trailing side and/or the magnetic film at the leading side may be made a reverse-trapezoid. (a) is one where the shape of the magnetic film at the trailing side is made a reverse-trapezoid and (b) is one where the shape of the magnetic film at the leading side is made a reverse-trapezoid. (c) is one where both magnetic films at the trailing side and the leading side are reverse-trapezoids. Since the head write-field distribution reflects the shape of the air bearing surface of the head magnetic material, the distribution in the width direction can be decreased by taking a shape like FIG. 12.

Figure 13:
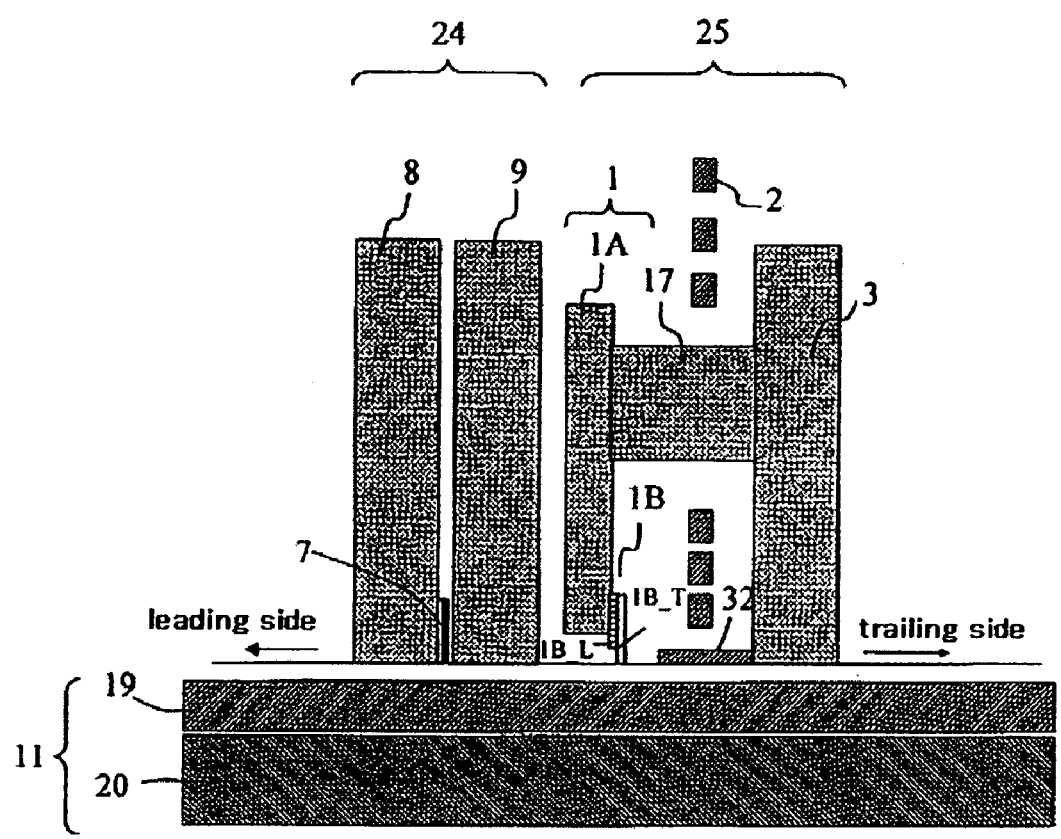
FIG. 13 is a cross-sectional schematic drawing at the track center illustrating another example of a magnetic head in accordance with an embodiment of the present invention.

Moreover, as shown in FIG. 13, the magnetic film 1B_L at the leading side may be recessed from the air bearing surface. According to the structure mentioned above, the write-field distribution width at the leading side can be further decreased.

An embodiment of a manufacturing method suitable for formation of a T-shaped main pole in accordance with the present invention will be explained referring to the drawings. A feature of the manufacturing method is that a magnetic pole dividing into two, a lower layer (leading side) and an upper layer (trailing side), is formed and a T-shaped main pole is formed. Next, the present invention is explained by using the process flow.

FIG. 14(a) is a drawing in which an under layer magnetic pole material 102 of the lower layer is formed on the $Al_2O_3$ 101 and a photo-resist mask 103 having a pattern width "a" of 200 nm is formed thereon. An FeCo/Cr multi-layer film and a single-layer film fabricated by a sputtering technique which exceeded 2 T were used for the magnetic pole material. A plating film may be used for the main pole material. Moreover, the film thickness of the main pole material was set to be 300 nm. Since definition and superposition accuracy are required in this method, an ArF scanner was used for formation of the photo-resist mask. In addition to an ArF scanner a KrF scanner or a stepper may also be used. Next, using the resist as a mask, the magnetic pole material is processed vertically as shown in FIG. 14(b) by using ion milling. In order to process vertically, the ion milling conditions were set to be −30°×13 minutes and −75°×5 minutes. The former is performed for the purpose of the perpendicular element and the latter is for the purpose of removing the re-deposition. As a result, a main pole width "b" of 80 nm was obtained as shown in FIG. 14(c). The shift by the milling was about 120 nm. Next, the magnetic pole material which is processed to be 80 nm in width is covered with 500 nm wide $Al_2O_3$ 104 (FIG. 14(d)), and it is polished to 200 nm by using CMP and planarized as shown in FIG. 14(e). $Al_2O_3$ system abrasive particles were used for CMP.

Figure 15:
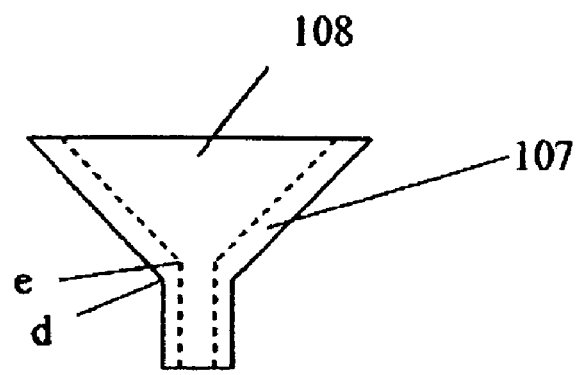
FIG. 15 is a drawing illustrating an example of a manufacturing method of a magnetic head in accordance with an embodiment of the present invention.

The upper layer magnetic pole material 105 as shown in FIG. 14(f) was formed on the planarized magnetic pole and on the $Al_2O_3$. An FeCo/Cr multi-layer film and a single film fabricated by a sputtering technique which exceeded 2 T were used for the magnetic pole material. A plating film may also be used for the main pole material 105. Next, as shown in FIG. 14(g), a pattern width resist pattern 106 was formed on this magnetic pole material 105. An ArF scanner was used for the formation of this photo-resist pattern, the same as the aforementioned photoresist mask 103. Using this photoresist and forming a magnetic pole material by using ion milling, a T-shaped main pole could be formed as shown in FIG. 14(h). In this process, as shown in FIG. 15, a head structure according to an embodiment of the present invention could be obtained in which the mask pattern 107 of the upper layer is wider than the mask pattern 108 of the lower layer, and the flare point "d" of the upper layer mask is arranged at the side to be an air bearing surface after completing the head element from the flare point "e" of the lower layer mask.

Figure 16A:
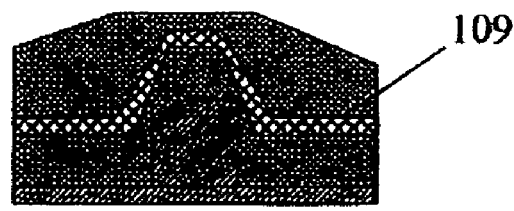
FIG. 16 is a drawing illustrating an example of a manufacturing method of a magnetic head in accordance with an embodiment of the present invention.
Figure 16B:
Figure 8:
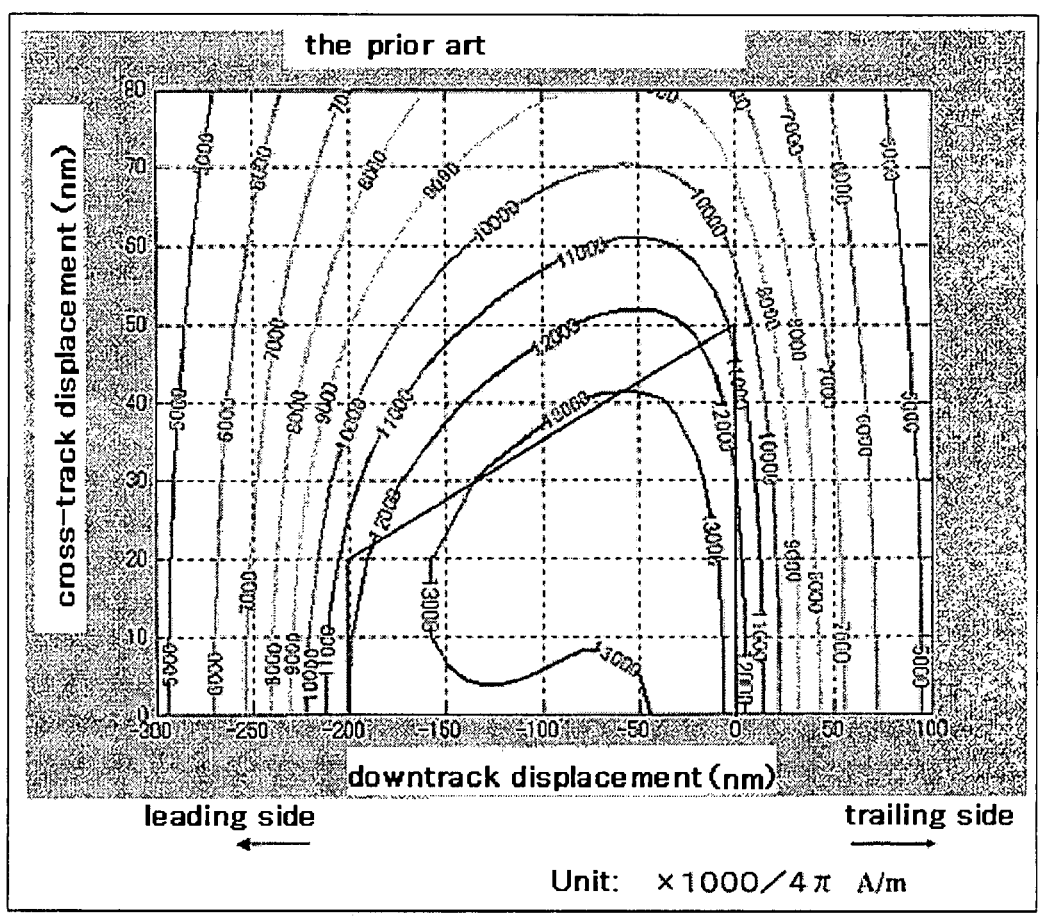
Figure 9:
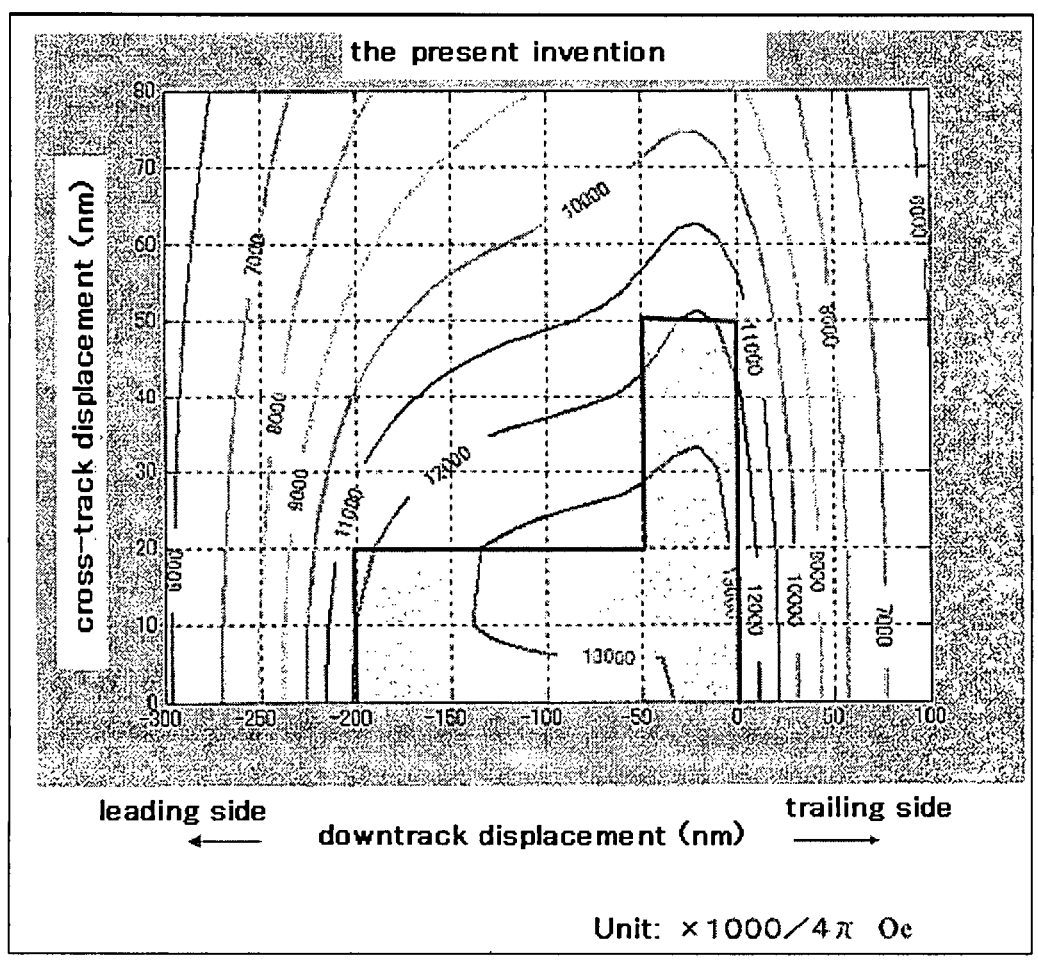

Moreover, another manufacturing process in accordance with an embodiment of the present invention is shown in FIG. 16. FIG. 16(a) is a drawing where a CMP stopper 109 is inserted between the $Al_2O_3$ covered in FIG. 14(d). Therefore, highly accurate film thickness control becomes possible due to the CMP stopper after polishing as shown in FIG. 16(b). The following processes are the same as the processes after FIG. 14(f).

What is claimed is:

1. A magnetic head for a perpendicular recording comprising a main pole and an auxiliary pole, wherein
the main pole has a track-width determining air bearing surface;
the main pole comprises a yoke part and a pole tip; the pole tip providing the air bearing surface and the yoke part is recessed from the air bearing surface in a direction perpendicular to the air bearing surface;
the pole tip comprises a first magnetic film and a second magnetic film;
the first magnetic film is coupled to the yoke part and has, at the air bearing surface, a first width;
the second magnetic film is coupled to the first magnetic film and has, at the air bearing surface, a second width;
the second width is greater than the first width;
the first magnetic film has a first throat height extending perpendicular from the air bearing surface for a first distance;
the second magnetic film has a second throat height extending perpendicular from the air bearing surface for a second distance; and
the second distance is smaller than the first distance.

2. A magnetic head according to claim 1, wherein the second width of the second magnetic film is greater than the film thickness of the second magnetic film.

3. A magnetic head according to claim 1, wherein the difference of the widths of the part where the second magnetic film and the first magnetic film are connected to each other at the air bearing surface is greater than the film thickness of the second magnetic film.

4. A magnetic head according to claim 1, wherein the second magnetic film and/or the first magnetic film has at the air bearing surface a reverse-trapezoid shape.

5. A magnetic head according to claim 1, wherein the first magnetic film is recessed from the air bearing surface in a direction perpendicular to the air bearing surface.

6. A magnetic head according to claim 1, wherein a flare angle of a squeeze point of the second magnetic film is greater than a flare angle of a squeeze point of the first magnetic film.

7. A magnetic disk storage apparatus comprising:
a recording medium;
a medium driving part driving the recording medium;
a magnetic head which has a write head and a read head which performs write and read to the recording medium; and
a head driving part positioning the magnetic head relative to the recording medium, wherein
the recording medium is a perpendicular recording medium having a soft under layer and a recording layer,
the write head has a main pole and an auxiliary pole,
the main pole has a track-width determining air bearing surface opposed to a surface of the recording medium;
the main pole comprises a yoke part and a pole tip; the pole tip providing the air bearing surface and the yoke part is recessed from the air bearing surface in a direction perpendicular to the air bearing surface,
the pole tip has first magnetic film and a second magnetic film;
the first magnetic film is coupled to the yoke part and has, at the air bearing surface, a first width;
the second magnetic film is coupled to the first magnetic film and has, at the air bearing surface, a second width;
the second width is greater than the first width;
the first magnetic film has a first throat height extending perpendicular from the air bearing surface for a first distance;
the second magnetic film has a second throat height extending perpendicular from the air bearing surface for a second distance; and
the second distance is smaller than the first distance.

8. A magnetic disk storage apparatus according to claim 7, wherein
a flare angle of a squeeze point of the second magnetic film is greater than a flare angle of a squeeze point of the first magnetic film.

* * * * *